(12) United States Patent
Biere et al.

(10) Patent No.: US 10,362,477 B1
(45) Date of Patent: Jul. 23, 2019

(54) MOBILE PHONE PERFORMANCE MANAGEMENT BASED ON PERSONALIZED USER CRITERIA

(71) Applicant: Sprint Communications Company L.P., Overland Park, KS (US)

(72) Inventors: Devon L. Biere, Lorain, OH (US); Michael A. Gailloux, Overland Park, KS (US); Vanessa L. Suwak, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/934,592

(22) Filed: Mar. 23, 2018

(51) Int. Cl.
| | |
|---|---|
| *H04W 4/80* | (2018.01) |
| *H04W 8/02* | (2009.01) |
| *H04W 8/24* | (2009.01) |
| *H04W 8/26* | (2009.01) |
| *H04W 8/20* | (2009.01) |
| *H04L 29/08* | (2006.01) |
| *H04W 8/18* | (2009.01) |

(52) U.S. Cl.
CPC ............. *H04W 8/205* (2013.01); *H04L 67/22* (2013.01); *H04W 8/183* (2013.01); *H04W 8/26* (2013.01)

(58) Field of Classification Search
CPC . H04W 24/08; H04W 36/0083; H04W 36/04; H04W 36/30; H04W 36/36; H04W 48/18; H04W 4/027; H04W 4/046; H04W 4/20
USPC ...... 455/456.1, 405, 432.1, 426.1, 406, 407, 455/566, 557, 418, 411, 414.2
See application file for complete search history.

(56) References Cited

U.S. PATENT DOCUMENTS

| | | | |
|---|---|---|---|
| 8,706,557 B1* | 4/2014 | Tavares ................ | G06Q 20/204 705/21 |
| 9,058,627 B1* | 6/2015 | Wasser ................. | G06F 3/0482 |
| 2007/0093247 A1* | 4/2007 | Yaqub ..................... | G08G 1/20 455/436 |
| 2011/0117873 A1* | 5/2011 | Daly .................... | G08B 27/005 455/404.1 |
| 2011/0258049 A1* | 10/2011 | Ramer .................. | G06Q 30/02 705/14.66 |

(Continued)

*Primary Examiner* — Joseph Arevalo (57) ABSTRACT

A method of migrating a mobile communication device. The method comprises monitoring subscriber mobile device behaviors by a device migration client application executing on a mobile communication device, where the messages comprise reports of subscriber mobile device behaviors, receiving a categorization message by the device migration client application, where the categorization message assigns the mobile communication device to a subscriber category, storing the subscriber category as a current subscriber category parameter of the device, receiving a plurality of device migration offers by the device migration client application, where each device migration offer identifies a subscriber category and information about a migration device and about a migration channel, generating a device migration notification by the device migration client application for each device migration offer that identifies a subscriber category that matches the current subscriber category parameter, and placing the device migration notification in a notification tray of the mobile communication device.

20 Claims, 8 Drawing Sheets

(56) References Cited

U.S. PATENT DOCUMENTS

| | | | | |
|---|---|---|---|---|
| 2013/0191198 A1* | 7/2013 | Carlson | ............ | G06Q 30/0215 |
| | | | | 705/14.23 |
| 2013/0304581 A1* | 11/2013 | Soroca | ................ | G06Q 30/02 |
| | | | | 705/14.64 |
| 2013/0304616 A1* | 11/2013 | Raleigh | ............ | G06Q 20/145 |
| | | | | 705/34 |
| 2013/0324054 A1* | 12/2013 | Stirrett | ................ | H04L 51/36 |
| | | | | 455/73 |
| 2014/0074605 A1* | 3/2014 | Sanchez | ............ | G06Q 20/40 |
| | | | | 705/14.53 |
| 2015/0033141 A1* | 1/2015 | Mishra | ................ | H04L 51/22 |
| | | | | 715/752 |
| 2015/0215832 A1* | 7/2015 | Fitzpatrick | ............ | H04W 48/18 |
| | | | | 455/426.1 |
| 2017/0267100 A1* | 9/2017 | Beattie, Jr. | ............ | B60K 35/00 |

* cited by examiner

MOBILE PHONE PERFORMANCE MANAGEMENT BASED ON PERSONALIZED USER CRITERIA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication device technology advances continuously and new features and devices are deployed to the market steadily. The deployment of a new model of a mobile communication device to the public entails a lot of logistics and advance preparation. The public must be informed about the forthcoming new product. Retail staff and technology staff need to be trained on the new product to help the public transition to the new devices. The actual new devices do not come out in one step but are distributed out to end users at a rate that depends upon the output stream of original equipment manufacturers (OEMs). It is desirable that new model roll-outs be executed smoothly and successfully.

SUMMARY

In an embodiment, a mobile communication device is disclosed. The mobile communication device comprises a radio transceiver, a processor, a non-transitory memory, and a device migration client application stored in the non-transitory memory. When executed by the processor, the device migration client application monitors subscriber mobile device behaviors, where the behaviors comprise one or more of installation of mobile applications on the device, calls to customer care, or installation of device software upgrades, transmits messages via the radio transceiver to a subscriber categorization computer system, where the messages comprise reports of subscriber mobile device behaviors, and receives a categorization message via the radio transceiver from the subscriber categorization computer system, where the categorization message assigns the mobile communication device to a subscriber category. The device migration client application further stores the subscriber category in the non-transitory memory as a current subscriber category parameter, receives a plurality of device migration offers via the radio transceiver, where each device migration offer identifies a subscriber category and information about a migration device and about a migration channel, wherein at least some of the device migration offers identify a subscriber category different from the current subscriber category parameter, generates a device migration notification for each device migration offer that identifies a subscriber category that matches the current subscriber category parameter, and places the device migration notification in a notification tray of the mobile communication device.

In another embodiment, a method of migrating a mobile communication device is disclosed. The method comprises monitoring subscriber mobile device behaviors by a device migration client application executing on a mobile communication device, where the behaviors comprise one or more of installation of mobile applications on the device, calls to customer care, or installation of device software upgrades, transmitting messages by the device migration client application to a subscriber categorization computer system, where the messages comprise reports of subscriber mobile device behaviors, and receiving a categorization message by the device migration client application from the subscriber categorization computer system, where the categorization message assigns the mobile communication device to a subscriber category. The method further comprises storing the subscriber category as a current subscriber category parameter in a non-transitory memory of the mobile communication device, receiving a plurality of device migration offers by the device migration client application, where each device migration offer identifies a subscriber category and information about a migration device and about a migration channel, wherein at least some of the device migration offers identify a subscriber category different from the current subscriber category parameter, generating a device migration notification by the device migration client application for each device migration offer that identifies a subscriber category that matches the current subscriber category parameter, and placing the device migration notification in a notification tray of the mobile communication device.

In yet another embodiment, a method of migrating mobile communication devices is disclosed. The method comprises accessing demographic information about a subscriber associated with a mobile communication device by a subscriber categorization application executing on a computer system, where the demographic information is accessed from a third party demographics service, accessing information on bill payment history of a subscription account associated with the mobile communication device by the subscriber categorization application, where the bill payment history is accessed from a billing data store, determining a number of mobile applications installed by the subscriber onto the mobile communication device by the subscriber categorization application, based on retrieving logs of events of installing the mobile applications from a mobile communication device event log data store, and determining a number of different phone numbers to which the mobile communication device places phone calls per month by the subscriber categorization application by accessing call detail records (CDRs) in a data store. The method further comprises determining a subscriber category associated with the mobile communication device by the subscriber categorization application based on the demographic information, the bill payment history information, the number of mobile applications installed by the subscriber onto the mobile communication device, and the number of different phone numbers to which the mobile communication device places phone calls per month, sending a message to a device migration client application on the mobile communication device by the subscriber categorization application where the message comprises the subscriber category, and sending a plurality of device migration offers to the device migration client application, where each device migration offer identifies a subscriber category and information about a migration device and about a migration channel, whereby the device migration client application is enabled to select to generate notifications about device migration offers that identify a subscriber category that matches a current subscriber category parameter stored in the mobile communication device and store those generated notifications on the mobile communication device while not generating notifications about device migration offers that identify a subscriber category that does not match the current subscriber category parameter.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for categorizing wireless communication service subscribers based on a variety of different factors and using that categorization to provide customized handling to those subscribers, specifically with respect to how they are notified of device migration opportunities. By customizing the handling of subscribers, the process of device migration can be improved for subscribers and made more efficient for wireless communication service providers who, in effect, underwrite the roll-out of new mobile communication devices. This system can improve mobile phone performance management based on subscriber categorization or a personalized user criteria.

A device migration client application is installed on the mobile communication device which monitors behaviors of the subscriber (i.e., user inputs, user commands, user interactions with interfaces of the device) and transmits reports on those behaviors to a categorization application executing on a computer system in the service provider's system. This report can further comprise information about mobile applications the subscriber has downloaded and installed on the mobile communication device. Wireless communication service subscribers can be analyzed and placed into one of a plurality of partitions or categories by the categorization application based on the reports on behaviors received from the client application, based on their demographics, their bill payment history, their phone call patterns, based on logs of their engagement in on-line chat sessions about devices sponsored by the service provider, based on their interactions with customer care, based on their history of returning devices, based on their history of losing devices, and based on other information. The categorizations may indicate that a subscriber is suitable for receiving a migration offer or notification to obtain a new mobile communication device and a channel for delivering the migration offer. Categorizations may distinguish a subscriber who has a history of turning over devices, hence someone who is likely selling new devices on the Internet for a profit. Categorizations may distinguish a subscriber whose purchase of a new device is likely to exercise a positive marketing influence on his or her personal network of contacts (e.g., someone who calls 30 or more different phone numbers each month may be inferred to have a larger personal network and hence provide a bigger marketing footprint for the device he or she uses).

Different offers for mobile communication device migrations can be assigned a category, and offers can be sent out to a large number of mobile communication devices. The device migration client application executing on these devices can parse these offers and determine what category is assigned to the offer. If the category of an offer matches the category assigned to the mobile communication device by the categorization application, the client application can generate a notification containing the offer and place the notification in the notifications tray of the device or pop-up the notification on the display of the device. If the category assigned to the offer does not match the category assigned to the mobile communication device, the client application may discard the offer or may save it in memory on the mobile communication device.

The categorization of subscribers may be used in different ways. When a subscriber calls into customer care and is temporarily on-hold, an interactive voice response (IVR) system may determine the category of the subscriber and present a migration offer assigned to a category that matches the subscriber's category to the subscriber via an audio. When a subscriber logs into a web site provided by the service provider, the web site may determine the category of the subscriber and present a migration offer to the subscriber via the web page, where the presented offer is assigned a category that matches to the subscriber's category.

Additionally, subscribers may, in part, be categorized with reference to their ability to activate a new mobile communication device on their own. The offers that are sent to subscribers identified as capable of self-activation may include metadata that promotes ease of initiating direct shipment of a new upgrade mobile communication device to this subscriber and also to perform activation of the upgrade device when it arrives. For example, the metadata may comprise snippets of executables that provide migration services to ease the process of migrating user configurations and/or user data from the subscribers current device model to the upgrade mobile communication device model. These snippets of executables may, for example, enable short range communication radios of one or both devices and beam user configurations and/or user data from one device to the upgrade device.

Subscribers, by contrast, who are not identified as suitable candidates for recommending upgrade device self-activation, may be send upgrade mobile device offers that contain metadata containing snippets of executables that, when activated, message back to a server computer to initiate processes to perform initiation and/or activation processes for a new upgrade device. Alternatively, this metadata may be assembled and built at a server computer and stored in a data store for quick access from a device retail store on the event that the subscriber enters the store to pick up a pre-reserved upgrade mobile communication device.

Figure 1:
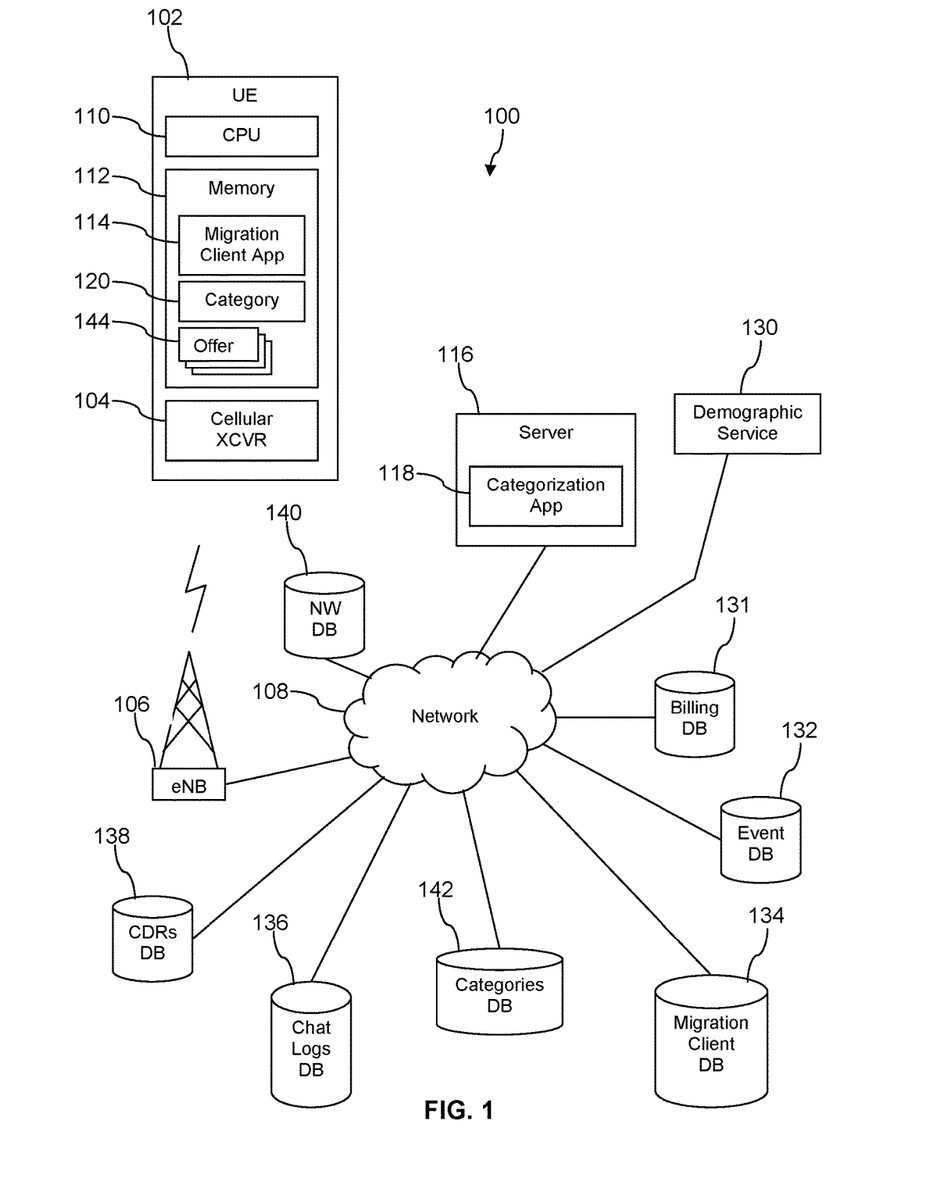
FIG. 1 is a block diagram of a communication system according to an embodiment of the disclosure.

Turning now to FIG. 1, a system 100 is described. In an embodiment, system 100 comprises a mobile communication device (user equipment—UE) 102 that comprises a cellular radio transceiver 104 that established a wireless communication link with a cell site 106 according to one or more of a long term evolution (LTE), code division multiple access (CDMA), global system for mobile communication (GSM), or worldwide interoperability for microwave access (WiMAX) wireless telecommunications protocol. The cell site 106 may communicatively couple the device 102 to a network 108 to promote the device placing voice calls or establishing data communication sessions. The device 102 may be a mobile phone, a smart phone, a personal digital assistant (PDA), a wearable computer, a headset computer, a laptop computer, a tablet computer, or a notebook computer. The device 102 may download and install mobile applications via the network 108. It may browse web sites via the network 108. The network comprises one or more public networks, one or more private networks, or a combination thereof. The system may comprise any number of mobile communication devices 102 and any number of cell sites 106. In an embodiment, the system 100 may comprise tens of millions of devices 102 and tens of thousands of cell sties 106.

The mobile communication device 102 further comprises a processor 110 and a memory 112. At least a portion of the memory 112 may be a non-transitory memory. The non-transitory portion of the memory 112 stores a migration client application 114. The system 100 further comprises a computer system 116 that executes a categorization application 118 that categorizes wireless communication service subscribers into different subscriber categories. Computer systems are discussed further hereinafter. The computer system 116 may be referred to in some contexts herein as a subscriber categorization computer system. After categorizing, the subscriber associated with the device 102, the categorization application 118 sends a categorization message to the migration client application 114 executed by the processor 110 via the cellular radio transceiver 104 of the device 102. The migration client application 114 stores the subscriber categorization in a subscriber category parameter 120 in the non-transitory portion of the memory 112.

Over time, one or more device migration offer may be sent to the device 102 and stored as an offer 144 in the non-transitory portion of the memory 112. The device migration offers 144 comprise information about a migration device and a migration channel as well as one or more subscriber categorization values. A migration device is a model of a mobile communication device to which the subscriber associated with the device 102 may wish to buy and migrate his or her wireless communication service plan. A migration channel is a process or source of the migration device, for example a ship-to-home and self-service configuration migration channel or a configure in store and pick-up in store migration channel.

The migration client application 114 compares the one or more migration categories identified in the device migration offer 144 to the current value of the subscriber category parameter 120. If the current value of the subscriber category parameter 120 matches one of the migration categories identified in the device migration offer 144, the migration client application 114 builds a notification containing the information about the migration device and the migration channel and places this in a notification tray for review by the subscriber. In an embodiment, the device migration offer 144 may comprise a brief description about the device and a link to further information on the device and an associated migration channel. Because the subscriber categorization of the subscriber associated with the device 102 and hence the value of the subscriber category parameter 120 may change over time, the device migration offers 144 may be retained in the non-transitory portion of memory 112 and the migration client application 114 may periodically reassess the device migration offers 144 versus the current value of the subscriber category parameter 120. Alternatively, the migration client application 114 may reassess the device migration offers 144 versus the current value of the subscriber category parameter 120 on the event of a revision of the parameter 120. The subscriber categorization desirably may be used to provide differentiated treatment for the subscriber. In an embodiment, the subscriber categorization may be used in other portions of the system 100 to provide differentiated treatment for the subscriber.

The categorization application 118 may evaluate and determine the subscriber categorization associated with the mobile communication device 102 periodically based on a plurality of information associated with the device 102 and/or with a wireless communication service subscriber associated with the device 102. The categorization application 118 may obtain information from one or more of a demographic service 130, a billing data store 131, an mobile communication device event data store 132, a migration client data store 134, a chat logs data store 136, a call detail records (CDRs) data store 138, or a network data store 140. Because the information associated with the device 102 and/or the subscriber may change over time, the categorization application 118 may determine a different subscriber categorization for the same subscriber at a later time and send a categorization message with the new subscriber category to the migration client application 114.

The demographic service 130 may be provided by a third party, for example via a subscription service paid for by a wireless communication service provider. The demographic information may be obtained via an application programming interface (API) extended by the demographic service 130. The demographic service 130 may be provided by a computer system. The demographic information may comprise one or more of age or age bracket, income or income bracket, education level, residence address, residence zipcode, marital status, number of children, and/or other demographic information.

The billing data store 131 may contain information about how often a subscriber has let his or her account go into arrears or was late in making a payment. The event data store 132 may contain information about events associated with the mobile communication device such as dropped call events and blocked call events.

The migration client data store 134 may store information about reports captured by the migration client application 114 and transmitted to the migration client data store 134 for use in categorization of the subscriber of the UE 102. The migration client application 114 may identify how many mobile applications have been downloaded and installed by the subscriber on the mobile communication device 102 and transmit this information to the migration client data store 134 for storage. The migration client application 114 may identify that the subscriber has downloaded and installed a device upgrade, such as an operating system upgrade and/or a device software upgrade. The chat logs data store 136 stores information about subscribers who log into a chat site maintained by a wireless communication service provider. The subject of chats participated in by the subscriber may provide insight into a technical ability of the subscriber—either a deficit of technical ability or a high degree of technical ability. The CDRs data store 138 may provide information about phone calls completed by the subscriber. For example, a number of different phone numbers called by the subscriber per month can be determined from the CDRs. It may be inferred that a subscriber that calls 30 or more different phone numbers per month has an extensive contact network and could exert influence others to buy the latest new mobile communication device, exercising a kind of demonstration and marketing function for the new communication device.

The network data store 140 may contain information, for example, about subscriber interactions with customer care sites, whereby the technical self-sufficiency of the subscriber may be inferred. The network data store 140 may contain information such as how many times the subscriber has reported a phone lost, how often the subscriber has returned a phone because of some problem, how often the subscriber has bought a new flagship device within 2 months of the initial release of the device, how often the user replaces his or her device. This information may be used to infer if the user is buying new devices and selling them on the Internet. This information may be used to infer a user is an early adapter or a state-of-the art wireless buff.

The categorization application 118 may evaluate the information from one or more of these 130, 131, 132, 134, 136, 138, and 140 and develop a categorization of the subscriber. The categorization application 118 can store the categorization of subscribers in a categories data store 142, for example where an identity of the subscriber is associated to the subscriber's categorization. The identity of the subscriber may be provided by a phone number of the subscriber, a mobile equipment identifier (MEID), an account number, or a different identification. Other elements of the system 100 may use the categorization of the subscriber stored in the categories data store 142. For example, when the subscriber calls customer care and is holding in an interactive voice recognition (IVR) system, the IVR may look up the subscriber's categorization, determine a migration offer that is suitable to this subscriber based on his or her subscriber categorization, and present an audio message describing the migration offer. If the subscriber browses to a web site provided by the wireless communication service provider, the web site may identify the subscriber, look up the subscriber's categorization, and present a brief description of a migration offer selected for him or her based on his or her subscriber categorization.

The categorization application 118 may compare the values of different information associated with a subscriber to thresholds. For example, an income greater than $70,000 per year and placing calls to more than 30 different phone numbers per month may be indicators of a subscriber who would be identified as an influential subscriber and be placed in an earlier adapter/influential subscriber category. Installation of more than 5 mobile applications by the subscriber to the device 102 may be used to infer a level of technical skill and comfort of the subscriber. Any purchase of a flagship mobile communication device within two months of initial release can be a threshold event or indicator. Not calling customer care within the first two months of purchasing a new device can be an indicator of technical skills and comfort. No device returns, no lost devices, and no device swaps within the first two months of obtaining a new device can be an indicator of an intention to keep and use the device rather than selling it on the Internet.

Figure 2:
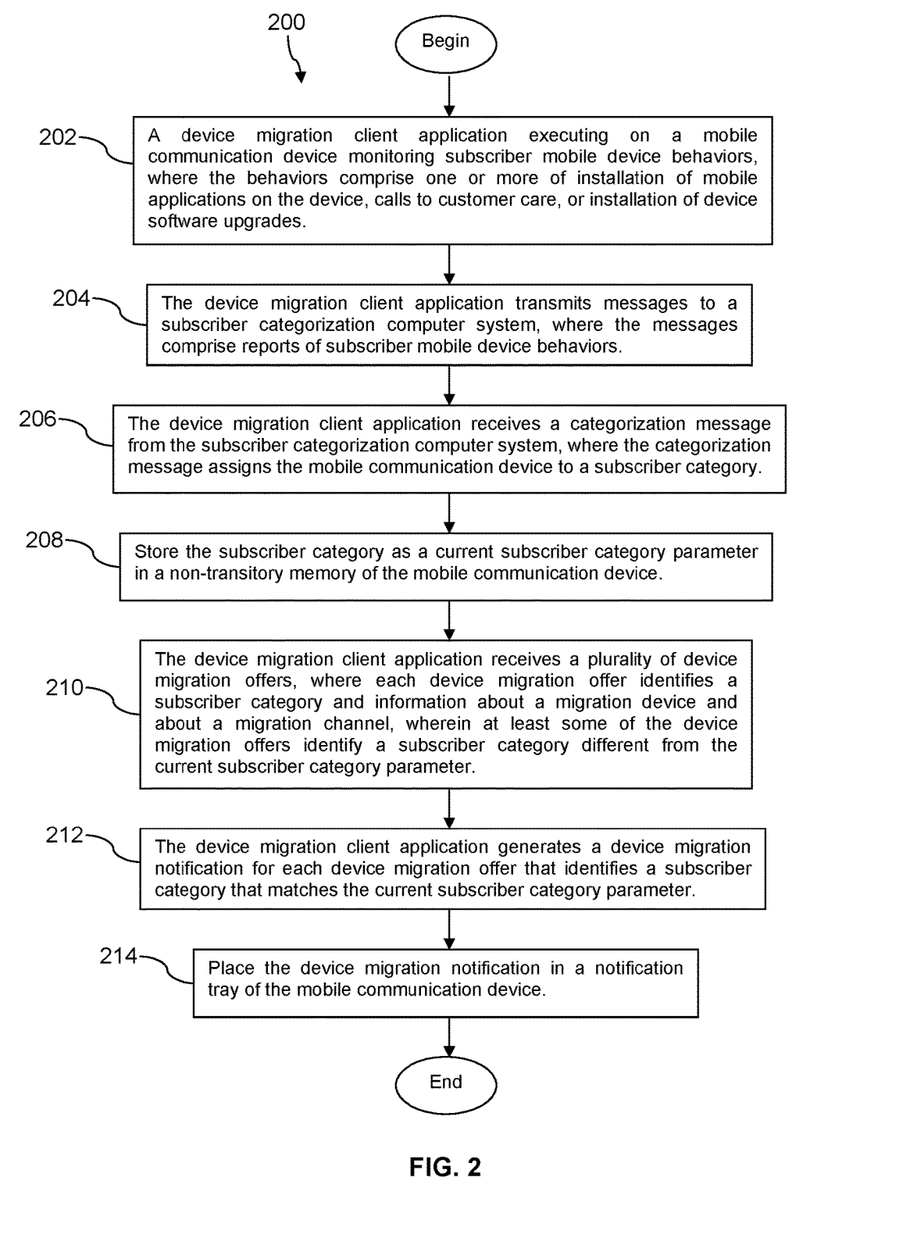
FIG. 2 is a flow chart of a method according to an embodiment of the disclosure.

Turning now to FIG. 2, a method 200 is described. At block 202 a device migration client application executing on a mobile communication device monitoring subscriber mobile device behaviors, where the behaviors comprise one or more of installation of mobile applications on the device, calls to customer care, or installation of device software upgrades. At block 204, the device migration client application transmits messages to a subscriber categorization computer system, where the messages comprise reports of subscriber mobile device behaviors. At block 206, the device migration client application receives a categorization message from the subscriber categorization computer system, where the categorization message assigns the mobile communication device to a subscriber category.

At block 208, store the subscriber category as a current subscriber category parameter in a non-transitory memory of the mobile communication device. At block 210, the device migration client application receives a plurality of device migration offers, where each device migration offer identifies a subscriber category and information about a migration device and about a migration channel, wherein at least some of the device migration offers identify a subscriber category different from the current subscriber category parameter. At block 212, the device migration client application generates a device migration notification for each device migration offer that identifies a subscriber category that matches the current subscriber category parameter. At block 214, place the device migration notification in a notification tray of the mobile communication device.

In an embodiment, the method may further comprise changing the subscriber category by the device migration client application in the current subscriber category parameter in the non-transitory memory in response to receiving a categorization message with a changed subscriber category, reading each of the plurality of device migration offers stored in the non-transitory memory by the device migration client application, comparing the subscriber category of each of the read device migration offers to the changed subscriber category by the device migration client application, generating a device migration notification by the device migration client application based on finding one of the stored device migration offers to match the changed subscriber category, and placing the device migration notification associated with the stored device migration offer that matches the changed subscriber category.

Figure 3A:
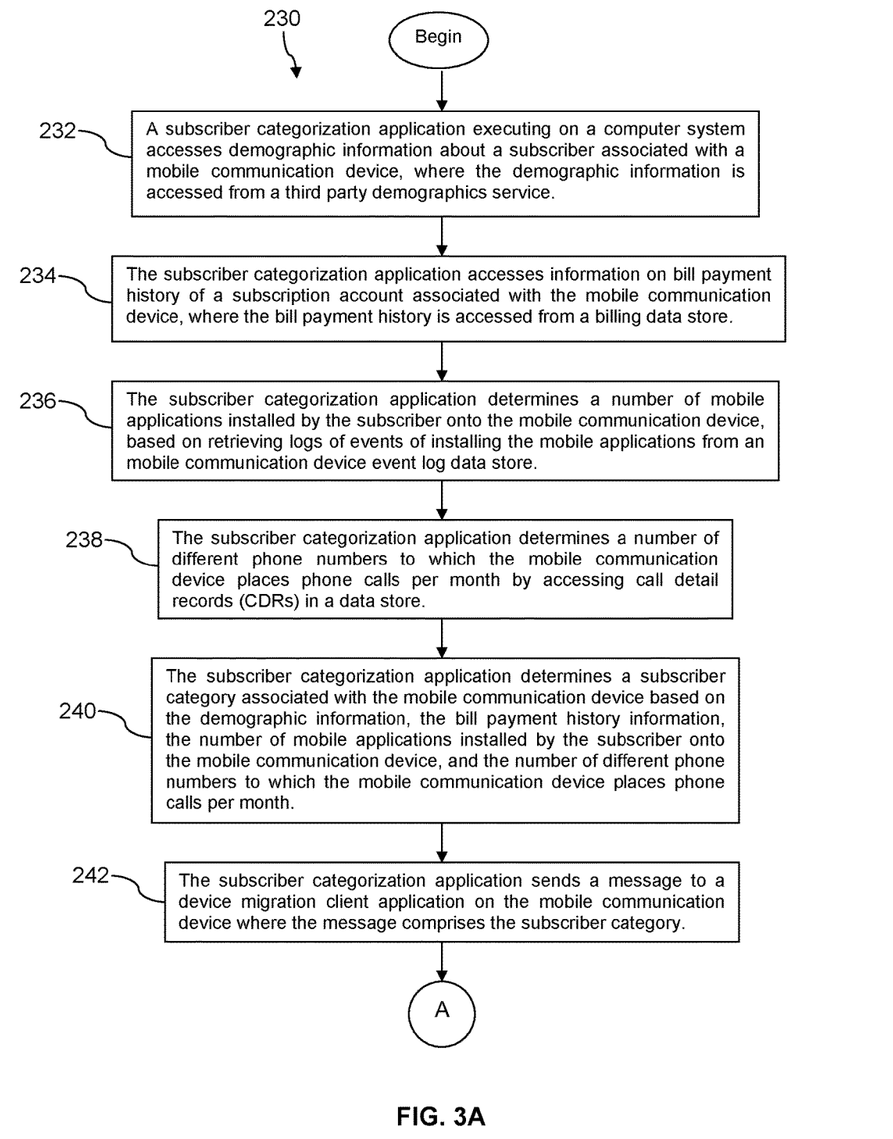
FIG. 3A and FIG. 3B are a flow chart of a method according to an embodiment of the disclosure.
Figure 3B:
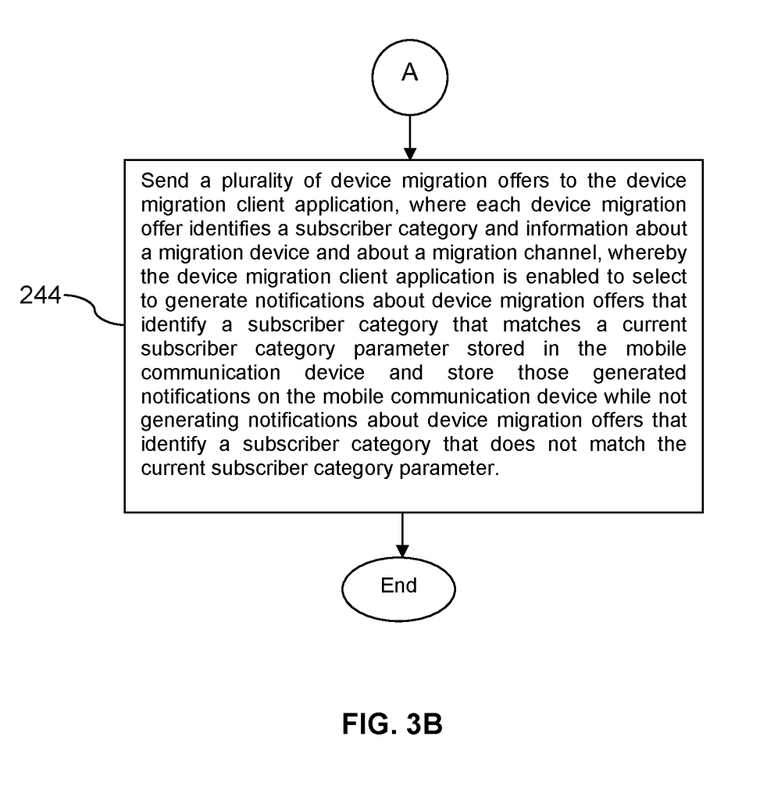

Turning now to FIG. 3A and FIG. 3B, a method 230 is described. At block 232, a subscriber categorization application executing on a computer system accesses demographic information about a subscriber associated with a mobile communication device, where the demographic information is accessed from a third party demographics service. At block 234, the subscriber categorization application accesses information on bill payment history of a subscription account associated with the mobile communication device, where the bill payment history is accessed from a billing data store. At block 236, the subscriber categorization application determines a number of mobile applications installed by the subscriber onto the mobile communication device, based on retrieving logs of events of installing the mobile applications from an mobile communication device event log data store.

At block 238, the subscriber categorization application determines a number of different phone numbers to which the mobile communication device places phone calls per month by accessing call detail records (CDRs) in a data store. At block 240, the subscriber categorization application determines a subscriber category associated with the mobile communication device based on the demographic information, the bill payment history information, the number of mobile applications installed by the subscriber onto the mobile communication device, and the number of different phone numbers to which the mobile communication device places phone calls per month.

At block 242, the subscriber categorization application sends a message to a device migration client application on the mobile communication device where the message comprises the subscriber category. At block 244, send a plurality of device migration offers to the device migration client application, where each device migration offer identifies a subscriber category and information about a migration device and about a migration channel, whereby the device migration client application is enabled to select to generate notifications about device migration offers that identify a subscriber category that matches a current subscriber category parameter stored in the mobile communication device and store those generated notifications on the mobile communication device while not generating notifications about device migration offers that identify a subscriber category that does not match the current subscriber category parameter.

Figure 4:
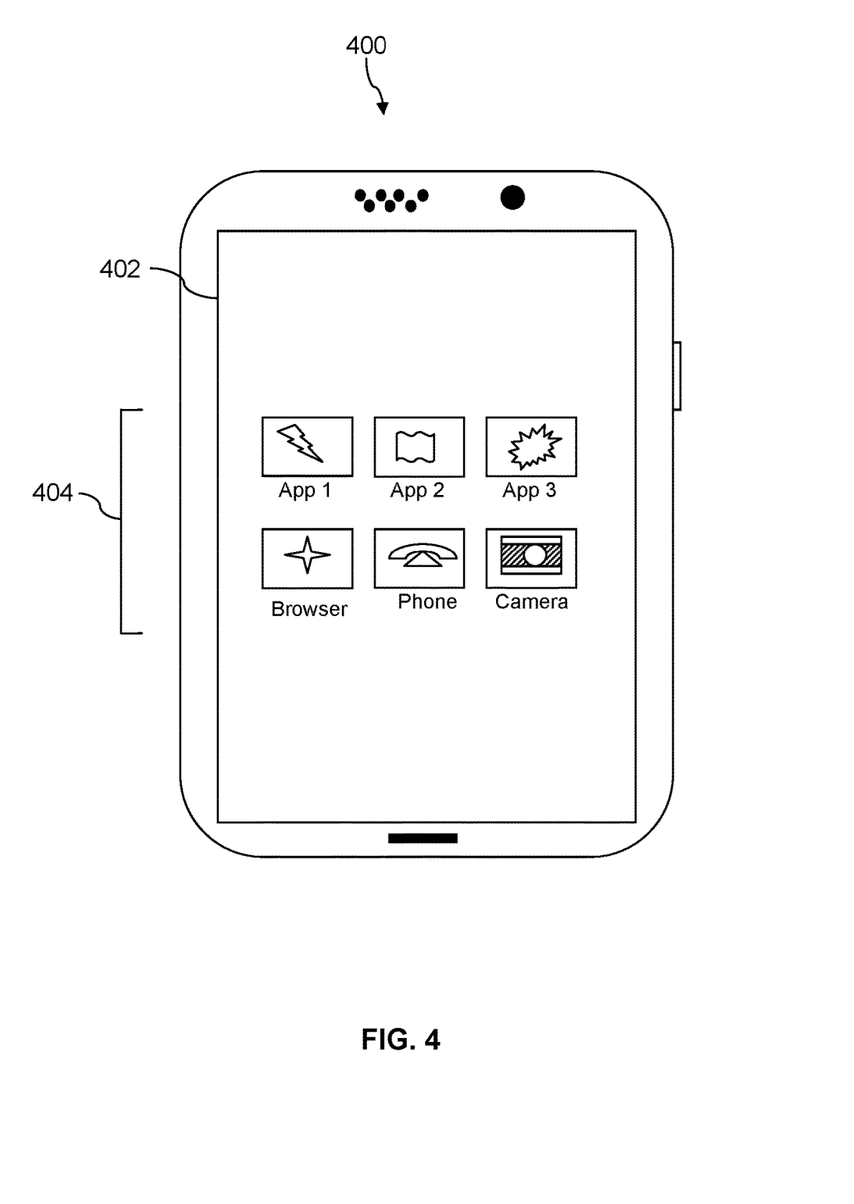
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
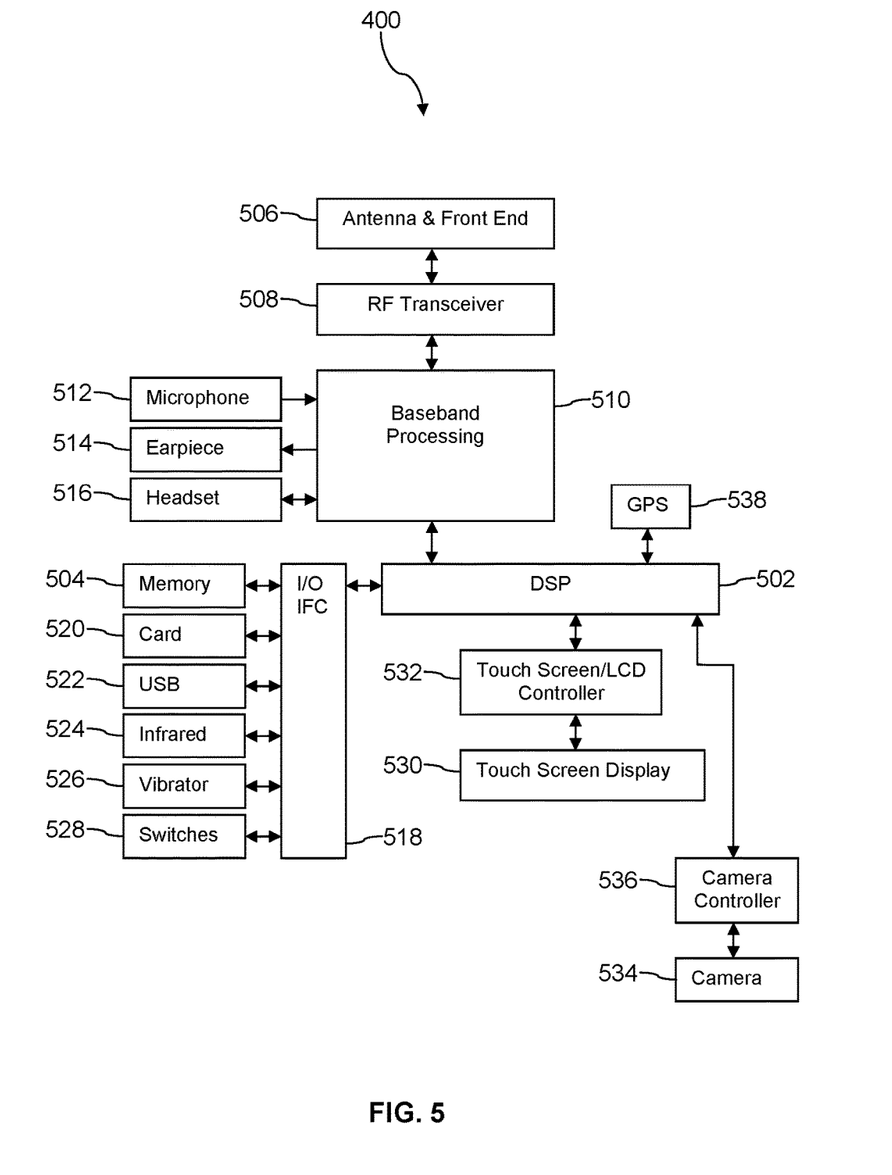
FIG. 5 is a block diagram of a hardware architecture according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
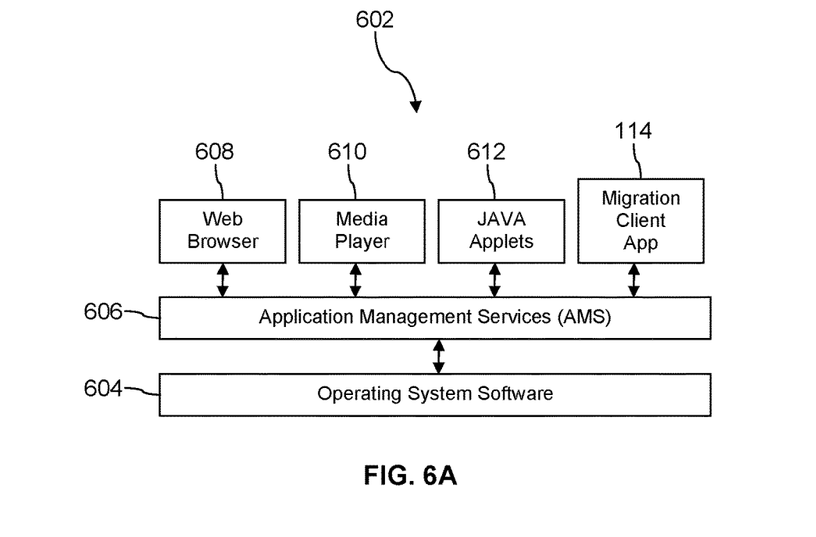
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality (e.g., the migration client application 114).

Figure 6B:
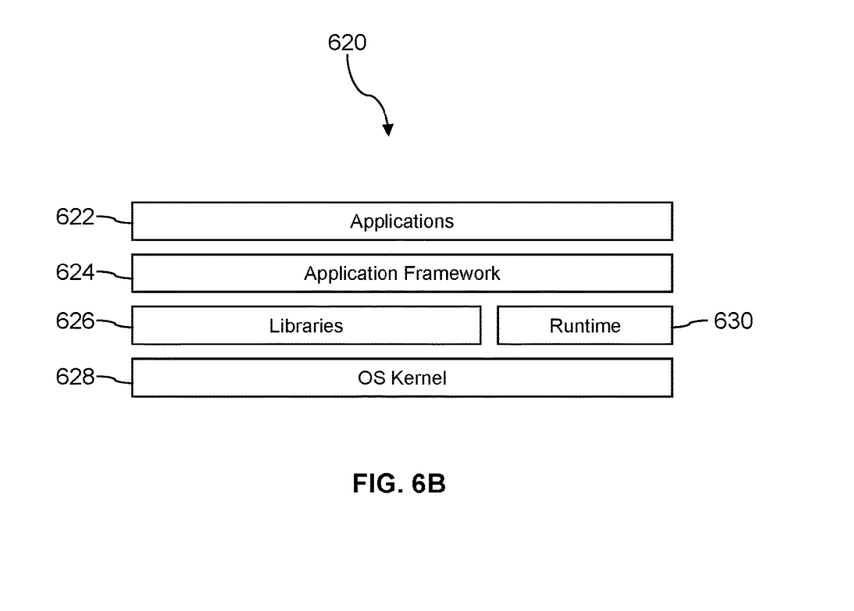
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
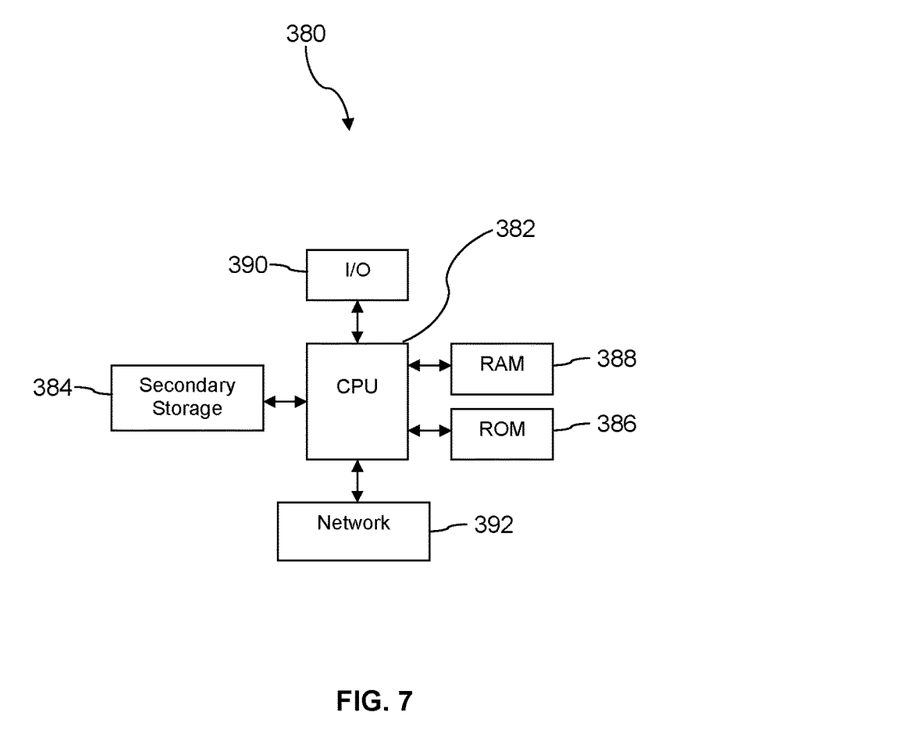
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of migrating mobile communication devices, comprising:
    accessing demographic information about a subscriber associated with a mobile communication device by a subscriber categorization application executing on a computer system, where the demographic information is accessed from a third party demographics service;
    accessing information on bill payment history of a subscription account associated with the mobile communication device by the subscriber categorization application, where the bill payment history is accessed from a billing data store;
    determining a number of mobile applications installed by the subscriber onto the mobile communication device by the subscriber categorization application, based on retrieving logs of events of installing the mobile applications from a mobile communication device event log data store;
    determining a number of different phone numbers to which the mobile communication device places phone calls per month by the subscriber categorization application by accessing call detail records (CDRs) in a data store;
    determining a subscriber category associated with the mobile communication device by the subscriber categorization application based on the demographic information, the bill payment history information, the number of mobile applications installed by the subscriber onto the mobile communication device, and the number of different phone numbers to which the mobile communication device places phone calls per month;
    sending a message to a device migration client application on the mobile communication device by the subscriber categorization application where the message comprises the subscriber category; and
    sending a plurality of device migration offers to the device migration client application, where each device migration offer identifies a subscriber category and information about a migration device and about a migration channel, whereby the device migration client application is enabled to select to generate notifications about device migration offers that identify a subscriber category that matches a current subscriber category parameter stored in the mobile communication device and store those generated notifications on the mobile communication device while not generating notifications about device migration offers that identify a subscriber category that does not match the current subscriber category parameter.

2. The method of claim 1, further comprising determining if a software upgrade has been performed by the subscriber, where determining the subscriber category associated with the mobile communication device is based further on whether a software upgrade has been performed by the subscriber.

3. The method of claim 1, wherein the demographic information comprises age information and income information.

4. The method of claim 1, wherein the demographic information comprises zip-code information and marital status information.

5. The method of claim 1, where the subscriber categorization application sends the categorization message to the mobile communication device at least in part over a wireless communication link according to a long term evolution (LTE), code division multiple access (CDMA), global system for mobile communication (GSM), or worldwide interoperability for microwave access (WiMAX) wireless telecommunications protocol.

6. The method of claim 1, wherein the mobile communication device is one of a mobile phone, a smart phone, a personal digital assistant (PDA), a wearable computer, a headset computer, a laptop computer, a tablet computer, or a notebook computer.

7. A method of migrating a mobile communication device, comprising:
    monitoring subscriber mobile device behaviors by a device migration client application executing on a mobile communication device, where the behaviors comprise one or more of installation of mobile applications on the mobile communication device, calls to customer care, or installation of device software upgrades;
    transmitting messages by the device migration client application to a subscriber categorization computer system, where the messages comprise reports of subscriber mobile device behaviors;
    receiving a categorization message by the device migration client application from the subscriber categorization computer system, where the categorization message assigns the mobile communication device to a subscriber category;
    storing the subscriber category as a current subscriber category parameter in a non-transitory memory of the mobile communication device;
    receiving a plurality of device migration offers by the device migration client application, where each device migration offer identifies a subscriber category and information about a migration device and about a migration channel, wherein at least some of the device migration offers identify a subscriber category different from the current subscriber category parameter;
    generating a device migration notification by the device migration client application for each device migration offer that identifies a subscriber category that matches the current subscriber category parameter; and
    placing the device migration notification in a notification tray of the mobile communication device.

8. The method of claim 7, further comprising storing the plurality of device migration offers in a non-transitory memory of the mobile communication device.

9. The method of claim 8, further comprising:
    changing the subscriber category by the device migration client application in the current subscriber category parameter in the non-transitory memory in response to receiving a categorization message with a changed subscriber category;
    reading each of the plurality of device migration offers stored in the non-transitory memory by the device migration client application;
    comparing the subscriber category of each of the read device migration offers to the changed subscriber category by the device migration client application;

generating a device migration notification by the device migration client application based on finding one of the stored device migration offers to match the changed subscriber category; and placing the device migration notification associated with the stored device migration offer that matches the changed subscriber category.

10. The method of claim 7, where the subscriber category identifies the subscriber as an influential subscriber.

11. The method of claim 7, where the subscriber category identifies the subscriber as likely to sell the mobile communication device.

12. The method of claim 7, where the mobile communication device is one of a mobile phone, a smart phone, a personal digital assistant (PDA), a wearable computer, a headset computer, a laptop computer, a tablet computer, or a notebook computer.

13. The method of claim 7, where the device migration client application communicates to the subscriber categorization computer system at least in part according to one of a long term evolution (LTE), code division multiple access (CDMA), global system for mobile communication (GSM), or worldwide interoperability for microwave access (WiMAX) wireless telecommunications protocol.

14. A mobile communication device, comprising:
a radio transceiver;
a processor;
a non-transitory memory; and
a device migration client application stored in the non-transitory memory that, when executed by the processor:
monitors subscriber mobile device behaviors, where the behaviors comprise one or more of installation of mobile applications on the mobile communication device, calls to customer care, or installation of device software upgrades,
transmits messages via the radio transceiver to a subscriber categorization computer system, where the messages comprise reports of subscriber mobile device behaviors,
receives a categorization message via the radio transceiver from the subscriber categorization computer system, where the categorization message assigns the mobile communication device to a subscriber category,
stores the subscriber category in the non-transitory memory as a current subscriber category parameter,
receives a plurality of device migration offers via the radio transceiver, where each device migration offer identifies a subscriber category and information about a migration device and about a migration channel, wherein at least some of the device migration offers identify a subscriber category different from the current subscriber category parameter,
generates a device migration notification for each device migration offer that identifies a subscriber category that matches the current subscriber category parameter, and
places the device migration notification in a notification tray of the mobile communication device.

15. The mobile communication device of claim 14, where the radio transceiver is configured to establish a wireless communication link with a cell site according to a long term evolution (LTE), code division multiple access (CDMA), global system for mobile communication (GSM), or worldwide interoperability for microwave access (WiMAX) wireless telecommunications protocol.

16. The mobile communication device of claim 14, where the mobile communication device is one of a mobile phone, a smart phone, a personal digital assistant (PDA), a wearable computer, a headset computer, a laptop computer, a tablet computer, or a notebook computer.

17. The mobile communication device of claim 14, wherein the migration channel is one of a pick-up in store migration channel or a ship-to-home self-service migration channel.

18. The mobile communication device of claim 14, wherein the subscriber mobile device behavior comprises a number of mobile applications downloaded and installed by a user of the mobile communication device.

19. The mobile communication device of claim 14, where the subscriber category identifies the subscriber as an influential subscriber.

20. The mobile communication device of claim 14, where the subscriber category identifies the subscriber as likely to sell the mobile communication device.

* * * * *